US012347892B2

(12) United States Patent
Lee et al.

(10) Patent No.: US 12,347,892 B2
(45) Date of Patent: Jul. 1, 2025

(54) BATTERY MODULE HAVING A CELL-UNIT MONITORING STRUCTURE AND MONITORING SYSTEM THEREOF

(71) Applicants: Hyundai Motor Company, Seoul (KR); Kia Corporation, Seoul (KR)

(72) Inventors: Ju Kyoung Lee, Gyeonggi-do (KR); Kyungmo Kim, Gyeonggi-do (KR); Seung-Beom Yoon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 18/078,035

(22) Filed: Dec. 8, 2022

(65) Prior Publication Data

US 2024/0097289 A1 Mar. 21, 2024

(30) Foreign Application Priority Data

Sep. 20, 2022 (KR) .................. 10-2022-0118876

(51) Int. Cl.
| | |
|---|---|
| *H01M 50/569* | (2021.01) |
| *H01M 10/42* | (2006.01) |
| *H01M 10/48* | (2006.01) |
| *H01M 50/105* | (2021.01) |
| *H01M 50/211* | (2021.01) |
| *H01M 50/519* | (2021.01) |

(52) U.S. Cl.
CPC ....... *H01M 50/569* (2021.01); *H01M 10/425* (2013.01); *H01M 10/482* (2013.01); *H01M 50/105* (2021.01); *H01M 50/211* (2021.01); *H01M 50/519* (2021.01); *H01M 2010/4271* (2013.01); *H01M 2220/20* (2013.01)

(58) Field of Classification Search
CPC .. H01N 50/569; H01N 10/425; H01N 50/105; H01N 50/211; H01N 10/482; H01N 50/519; G01R 31/6865; G01R 1/073
See application file for complete search history.

(56) References Cited

U.S. PATENT DOCUMENTS

| | | | |
|---|---|---|---|
| 9,136,509 B2* | 9/2015 | Tam | H02J 7/007182 |
| 11,094,984 B1* | 8/2021 | Ai | H01M 50/105 |
| 2016/0233465 A1* | 8/2016 | Lee | H01M 10/625 |
| 2020/0176745 A1* | 6/2020 | Lee | H01M 50/569 |
| 2022/0365122 A1* | 11/2022 | Kim | G01R 27/025 |

FOREIGN PATENT DOCUMENTS

| | | | | |
|---|---|---|---|---|
| CN | 105706272 B | * | 5/2017 | .......... H01M 10/425 |
| EP | 2685541 A1 | * | 1/2014 | .......... G01R 31/362 |

* cited by examiner

*Primary Examiner* — Christopher E Mahoney
(74) *Attorney, Agent, or Firm* — Fox Rothschild LLP

(57) ABSTRACT

A battery module having a cell-unit monitoring structure is provided. The battery module includes a battery cell stack formed by stacking a plurality of pouch-type battery cells, a case configured to cover the battery cell stack through an assembly structure of a plurality of plates, and a sensing block including an interface module configured to measure a sensing signal by electrically connecting the individual cell pouch and battery cell electrode tabs exposed through the front side and the rear side of the case for inspection of an insulation resistance state of an individual cell pouch.

18 Claims, 9 Drawing Sheets

(S121)

(S123)

BATTERY MODULE HAVING A CELL-UNIT MONITORING STRUCTURE AND MONITORING SYSTEM THEREOF

CROSS-REFERENCE TO RELATED APPLICATION

This application claims under 35 U.S.C. § 119(a) the benefit of Korean Patent Application No. 10-2022-0118876 filed in the Korean Intellectual Property Office on Sep. 20, 2022, the entire contents of which are incorporated herein by reference.

BACKGROUND OF THE DISCLOSURE

Technical Field

The present disclosure relates to a battery module having a cell-unit monitoring structure and a monitoring system thereof.

Background

In general, a battery pack for an electric vehicle (EV) to be mounted in a vehicle includes a plurality of battery modules which includes a plurality of battery cells.

For example, the battery cell may be configured in a pouch type, in which electrode assemblies in which a plurality of positive electrodes and negative electrodes are assembled are stacked and installed in an aluminum pouch. Then, after stacking a predetermined number of pouch-type battery cells, the battery module is assembled by a case that includes a plurality of frames.

These pouch-type battery cells are light, less likely to leak electrolyte solution, and flexible in shape, so they have the advantage of being able to implement a battery of the same capacity with a smaller volume and mass compared to a can-type battery cell.

However, in pouch-type battery cells, swelling may occur due to variations in cell thickness according to the state of charge (SOC) of the battery, and the swelling may cause damage and performance degradation to the battery module, so stability inspection is performed on the pouch-type battery cells.

For example, an insulation resistance/voltage measurement test, which is one of the quality control items for an electric vehicle battery, is one of the important inspection items directly related to the safety of the battery.

If the aluminum of the pouch is exposed due to various reasons when assembling the battery cell, a situation contacting the electrode of the battery cell may occur, and in this case, if the pouch and the electrode of the battery cell are not insulated, a corrosion phenomenon may occur in the aluminum of the pouch during charging/discharging.

The aluminum corrosion of the battery cell pouch may cause a problem of electric leakage, and in particular, in the case of an electric vehicle battery, since many battery cells are in contact, it is one of the higher safety issues.

Therefore, in general, an insulation abnormality inspection of the pouch is performed at the stage of assembling the battery cell, and after completing the cell assembly, the insulation resistance inspection of individual cells is performed again during the stock inspection before being assembled into a battery module.

However, since the battery insulation state may not be checked after assembling the battery module in the electric vehicle, there is a disadvantage in that the battery insulation state may not be monitored while driving the electric vehicle. Therefore, capability of cell-unit measuring the insulation resistance may provide an advantage in managing the stability of the battery module for an electric vehicle.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure provides a battery module having a cell-unit monitoring structure and a monitoring system thereof capable of insulation state of an individual battery cell during the process of manufacturing a battery or after installation into an electric vehicle, by employing an interface module connected to individual battery cell pouches.

An exemplary battery module having a cell-unit monitoring structure includes a battery cell stack formed by stacking a plurality of battery cells sealed by an individual cell pouch, a case configured to cover the battery cell stack through an assembly structure of a plurality of plates, and a sensing block including an interface module configured to measure a sensing signal by electrically connecting the individual cell pouch and battery cell electrode tabs exposed through the front side and the rear side of the case for inspection of an insulation resistance state of an individual cell pouch.

The interface module may include a printed circuit board (PCB) connector unit configured to connect communication with a controller of an external system, for monitoring operation state of the battery module applied to an electric vehicle and/or for managing quality control in a battery production line.

The interface module may further include a plurality of busbars electrically connected to the electrode tab exposed from the battery cell and configured to sense voltage information, a first sensing lead line configured to connect the plurality of busbars and the PCB connector unit, and a pouch contact probe configured to physically contact the individual cell pouch and a second sensing lead line configured to electrically connect the individual cell pouch and the PCB connector unit.

The PCB connector unit may include a plurality of terminals that are respectively connected to the first sensing lead line and the second sensing lead line. The sensing signal measured from an individual battery cell and a corresponding cell pouch may be distinguished according to the plurality of terminals.

In the sensing block, insulation cell barriers may be formed protruding at regular intervals in a width direction at an upper end portion of a housing, and the second sensing lead line and the pouch contact probe may be disposed between adjacent insulation cell barriers.

The second sensing lead line may be disposed on a housing wall formed between insulation cell barriers of the sensing block, and the pouch contact probe may be disposed between and configured to physically connect the second sensing lead line and the individual cell pouch.

The pouch contact probe may be formed of a metal fabric foam having flame retardancy and physical variability to overlap with the second sensing lead line and the individual cell pouch, respectively.

A contact position of the pouch contact probe may be positioned on a cut end of a cell pouch of an individual battery cell.

An exemplary battery module includes a case configured to cover a stack of a plurality of battery cells sealed by an individual pouch, and a sensing block including an interface module configured to measure a sensing signal by electrically connecting the individual cell pouch and battery cell electrode tabs exposed through the front side and the rear side of the case for inspection of an insulation resistance state of an individual cell pouch included in the battery cell stack, where the interface module includes a PCB connector unit positioned on an upper portion of the sensing block, a plurality of busbars electrically connected to the electrode tab exposed from the battery cell and configured to sense voltage information, a first sensing lead line configured to connect the plurality of busbars and the PCB connector unit, a pouch contact probe configured to physically contact an upper cut end of the individual cell pouch, and a second sensing lead line configured to electrically connect the pouch contact probe and the PCB connector unit.

In the sensing block, insulation cell barriers may be formed protruding at regular intervals in a width direction at an upper end portion of a housing, and the second sensing lead line and the pouch contact probe may be disposed between adjacent insulation cell barriers.

The PCB connector unit may include a plurality of terminals that are respectively connected to the first sensing lead line and the second sensing lead line to distinguish positions and sensing signals of individual battery cells.

The pouch contact probe may be configured to form a first overlap portion overlapping with a predetermined thickness or more with the second sensing lead line in contact with a first end portion and to form a predetermined gap with a housing wall of the sensing block.

The pouch contact probe may be configured to form a second overlap portion overlapping with a predetermined thickness with the upper cut end of the individual cell pouch in contact with a second end portion.

An exemplary monitoring system includes a battery module having a cell-unit monitoring structure, and a controller configured to collect sensing signals detected at respective battery cells through an interface module of the battery module to monitor an insulation state of an individual cell pouch.

The controller may be applied to a battery management system of an electric vehicle or a battery inspection system of a battery production line.

The controller may be configured to monitor the insulation state of the individual cell pouch by performing a method that includes performing an insulation inspection based on the collected sensing signals, the insulation inspection including at least one of an insulation voltage inspection, an insulation resistance inspection, and an impedance inspection of an individual battery cell unit, and displaying an insulation inspection result including a defective cell position when an insulation defect occurs.

The insulation voltage inspection may include identifying a current conduction state by applying a source signal to both ends of the individual cell pouch through a pouch contact probe connected to the interface module, and determining that, by comparing a voltage in the current conduction state with a predetermined upper voltage limit value, the insulation is defective when the voltage is below the upper voltage limit value.

The insulation resistance inspection may include measuring resistance between a negative electrode tab and the cell pouch of the individual battery cell, and determining that, by comparing the resistance with a predetermined upper resistance limit value, the insulation is defective when the resistance is below the upper resistance limit value.

The impedance inspection may include extracting characteristic data of resistance and capacitance through current values obtained by applying an AC voltage between a negative electrode tab and the cell pouch of the individual battery cell, comparing the resistance with a predetermined upper and lower resistance limit value range defined for the impedance inspection, and determining that the insulation is defective when the resistance does not exist within the upper and lower resistance limit value range.

In the impedance inspection, components of capacitance and resistance between the cell pouch and the negative electrode tab may be separated, and specific resistance and a phase change at a specific frequency for each model on an electrochemical Nyquist plot and a Bode plot may be analyzed.

According to an exemplary embodiment, the interface module may be configured to connect the electrode tab and the cell pouch in the individual battery cell within the battery module, and thereby the insulation state of the individual battery cell may be monitored during the process of the manufacturing the battery or after installation into the electric vehicle.

In addition, since the insulation state of each battery cell in a battery pack applied to an electric vehicle may be precise checked, advantages of securing safety and performing effective maintenance with minimal cost may be achieved, by identifying defect in respective battery cells in real time through a BMS and displaying a diagnosis result including the defect cause and the defective cell position.

In addition, the advantage of simultaneously detecting insulation characteristics of individual pouches through the interface module may be achieved, without employing a separate inspection device to respective cells of the battery module for inspection of the pouch characteristics.

As discussed, the method and system suitably include use of a controller or processor.

In another embodiment, vehicles are provided that comprise an apparatus as disclosed herein.

DETAILED DESCRIPTION OF THE EMBODIMENTS

Figure 1:
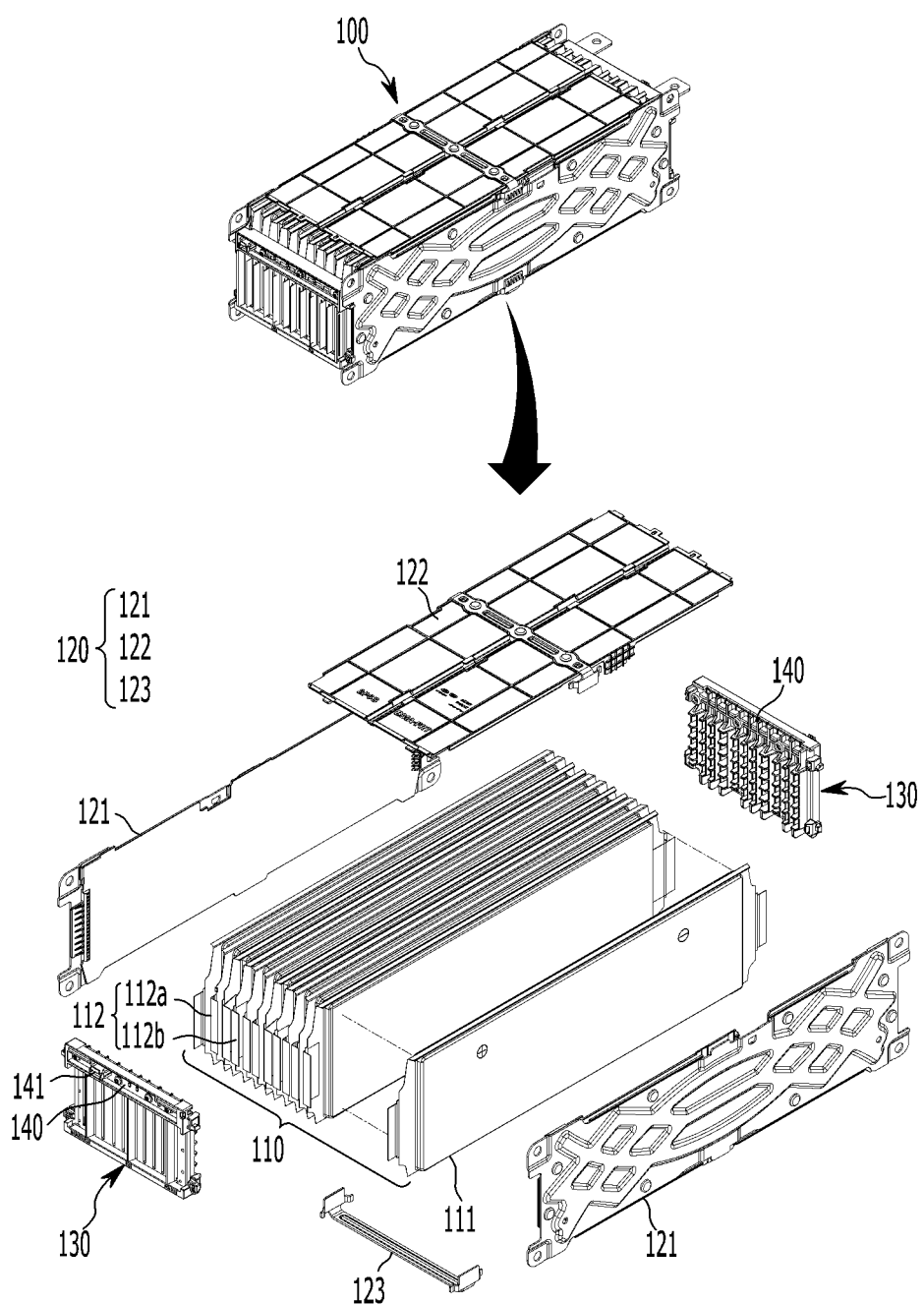
FIG. 1 illustrates an exploded perspective view of a battery module according to an exemplary embodiment.

The present disclosure will be described more fully hereinafter with reference to the accompanying drawings, in which exemplary embodiments of the disclosure are shown.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

Additionally, it is understood that one or more of the below methods, or embodiments thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Hereinafter, a battery module having a cell-unit monitoring structure according to an exemplary embodiment and a monitoring system thereof is described in detail with reference to the drawing.

FIG. 1 illustrates an exploded perspective view of a battery module according to an exemplary embodiment.

Figure 2:
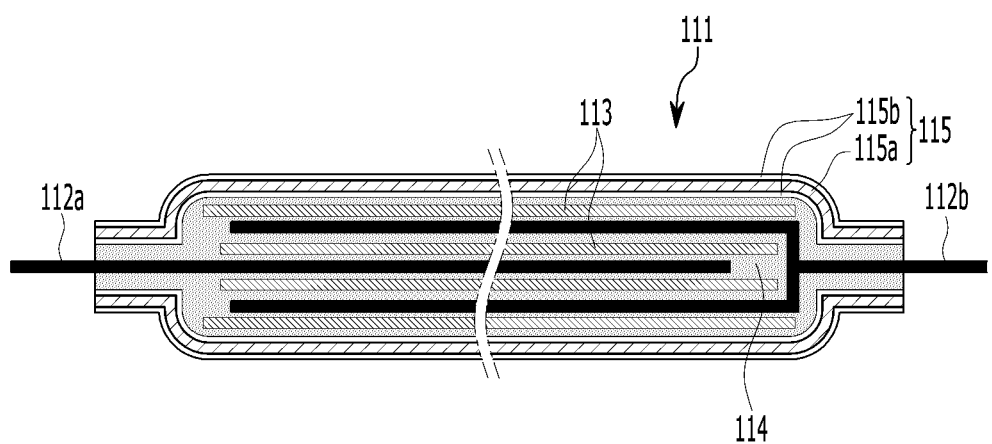
FIG. 2 is a cross-sectional view showing a structure of a battery cell according to an exemplary embodiment.

FIG. 2 is a cross-sectional view showing a structure of a battery cell according to an exemplary embodiment.

Referring to FIG. 1 and FIG. 2, a battery module 100 according to an exemplary embodiment may include a battery cell stack 110, a case 120, and a sensing block 130. The battery module 100 may be a product assembled on a production line in a factory or may be included in a battery pack mounted in an electric vehicle.

The battery cell stack 110 is formed by stacking a plurality of pouch-type battery cells 111 depending on a predetermined capacity or standard.

Here, in the battery cell 111, positive electrodes 112*a* and negative electrodes 112*b* may be alternatingly stacked, a separator 113 is interposed between the positive and negative electrodes 112a and 112b, and then the battery cell 111 may be sealed by a cell pouch 115 after being filled with an electrolyte solution 114.

At this time, the cell pouch 115 may have a cross-sectional structure in which an insulating layer 115b is formed on upper and lower portions of the aluminum layer 115a, respectively. In addition, the positive electrode 112a and the negative electrode 112b are exposed to an outside of the cell pouch 115, and exposed portions may be collectively called "an electrode tab 112".

The case 120 may have an assembly structure of a rectangular parallelepiped shape that covers the battery cell stack 110 through a plurality of plates. For example, the case 120 includes an end plate 121 at both sides, a top cover 122, and a lower clamp 123 that are assembled through fastening members, and is configured to expose the battery cell stack 110 while a front side, a rear side, and a bottom side of the case 120 are partially open.

The case 120 may be made of at least one of high-strength aluminum, aluminum alloy, steel, titanium, synthetic resin, and composite material.

The sensing block 130 may include an interface module 140 configured to measure a sensing signal by electrically connect the individual cell pouch 115 and the electrode tabs 112 of the battery cell 111 exposed through the front side and the rear side of the case 120, for inspection of an insulation resistance state of the individual cell pouch 115.

For monitoring an operation state of the battery module 100, the interface module 140 may include a printed circuit board (PCB) connector unit 141 configured to connect communication with a controller 200 of an external system.

For example, when the battery module 100 is applied to an electric vehicle, the interface module 140 may be configured to connect communication with the controller 200 of a battery management system (BMS) of the electric vehicle to communicate sensing signals. In addition, when the battery module 100 is manufactured in the battery production line of the factory, the interface module 140 may connect communication with the controller 200 of the battery inspection system that manages quality of the battery module 100, and communicate sensing signals.

The interworking of the interface module 140 and the system controller 200 is described later in detail.

Figure 3:
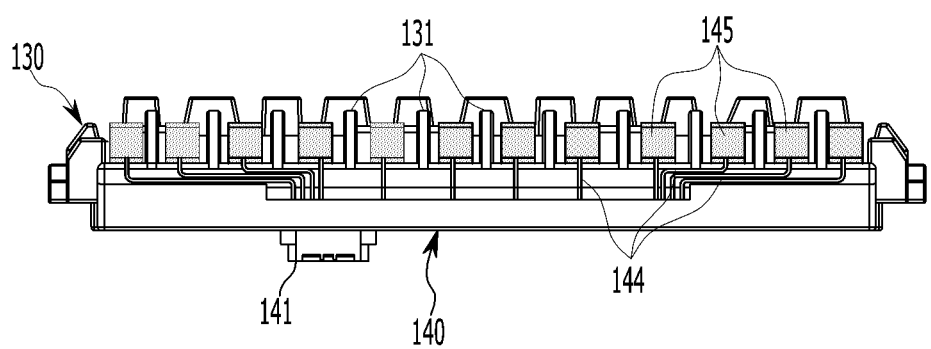
FIG. 3 illustrates a configuration of an interface module applied to a sensing block according to an exemplary embodiment.

FIG. 3 illustrates a configuration of an interface module applied to a sensing block according to an exemplary embodiment.

Figure 4:
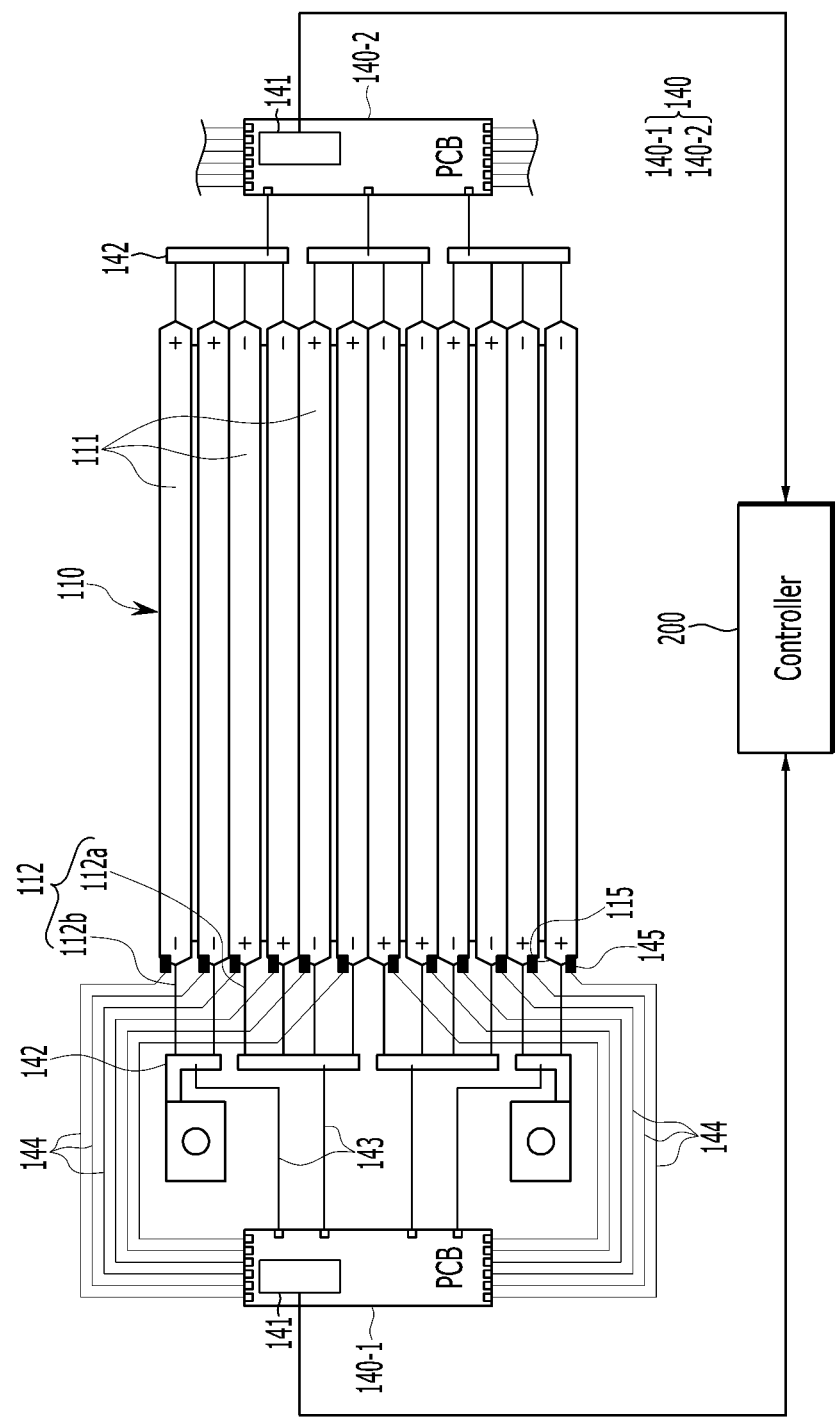
FIG. 4 illustrates a monitoring system of a battery module utilizing an interface module according to an exemplary embodiment.

FIG. 4 illustrates a monitoring system of a battery module utilizing an interface module according to an exemplary embodiment.

Referring to FIG. 3 and FIG. 4, the interface module 140 according to an exemplary embodiment may include the PCB connector unit 141 positioned on an upper portion of the sensing block 130, a plurality of busbars 142 electrically connected to the electrode tab 112 exposed from the battery cell 111 and configured to sense voltage information, a first sensing lead line 143 configured to connect the plurality of busbars 142 and the PCB connector unit 141, a second sensing lead line 144 configured to electrically connect the individual cell pouch 115 and the PCB connector unit 141, and a pouch contact probe 145 configured to physically contact an upper portion of the individual cell pouch 115 and the second sensing lead line 144. Here, the interface module 140 includes a first interface module 140-1 at a front side and a second interface module 140-2 at a rear side, and the omitted portions around the second interface module 140-2 in FIG. 4 may be referred to the first interface module 140-1.

The PCB connector unit 141 may include a plurality of terminals that are respectively connected to the first sensing lead line 143 and the second sensing lead line 144. At this time, according to the terminal of the PCB connector unit 141 to which the lead lines 141 and 144 are connected, positions of the individual battery cells 111 and the sensing signals measured from the cell pouch 115 may be distinguished. The sensing signal may include at least one of an insulation voltage, insulation resistance, and impedance.

In the sensing block 130, insulation cell barriers 131 may be formed protruding at regular intervals in the width direction at an upper end portion of a housing, and the second sensing lead line 144 and the pouch contact probe 145 may be disposed between adjacent insulation cell barriers 131. The pouch contact probe 145 may be formed of a metal fabric foam having flame retardancy and physical variability (e.g., physically deformable in width and length), and may be fixedly installed between the second sensing lead line 144 and the individual cell pouch 115 to form physical connection therebetween. However, the present disclosure is not limited thereto, and materials that may be used as battery components may be applied.

Figure 5:
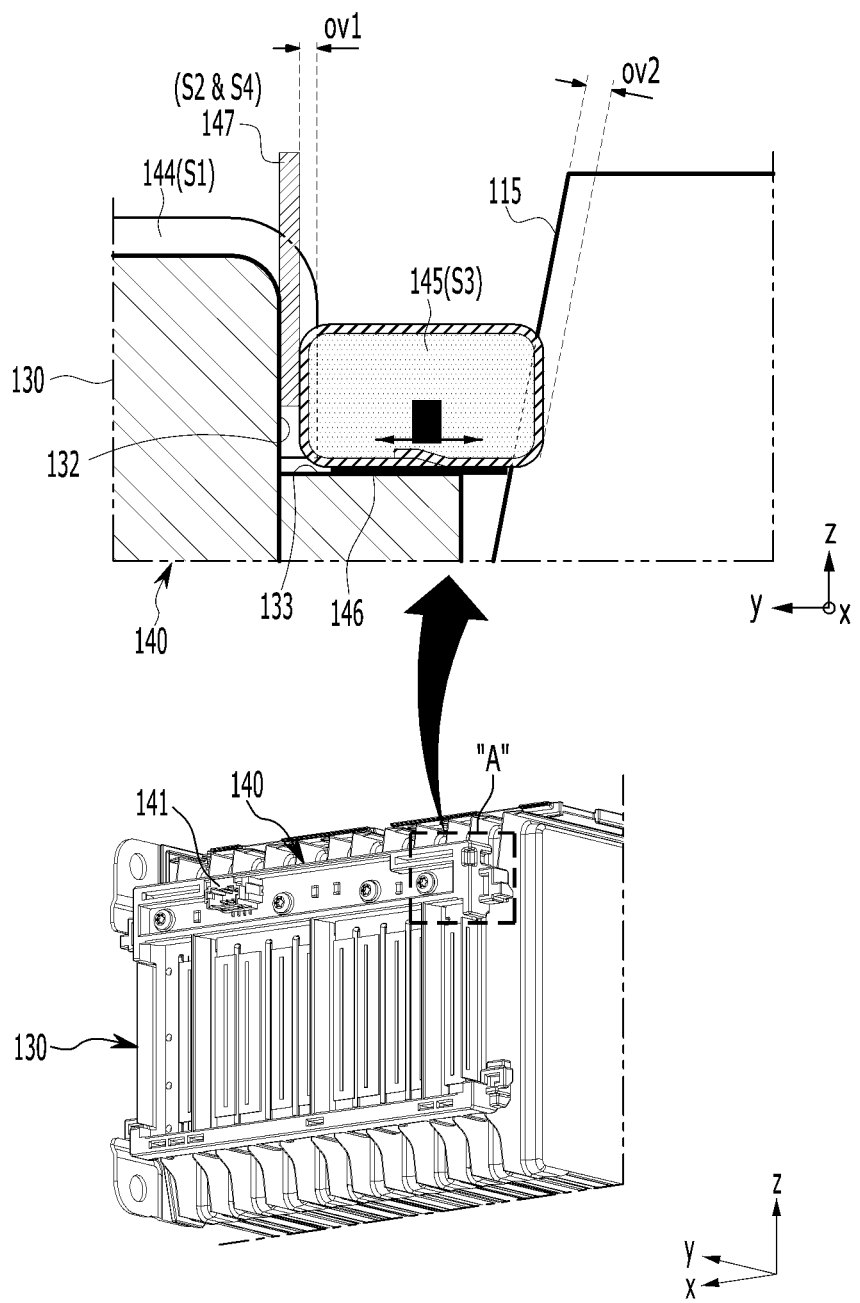
FIG. 5 illustrates an installation scheme of a sensing lead line and a pouch contact probe according to an exemplary embodiment.

For example, FIG. 5 illustrates an installation scheme of a sensing lead line and a pouch contact probe according to an exemplary embodiment.

In more detail, FIG. 5 shows an installation scheme of the second sensing lead line 144 and the pouch contact probe 145 for connection of the interface module 140 to the individual cell pouch 115, and a partial cross-sectional view of the portion "A" defining the contact position.

The installation scheme of the second sensing lead line 144 and the pouch contact probe 145 according to an exemplary embodiment may include disposing the second sensing lead line 144 on a housing wall 132 formed between the insulation cell barriers 131 of the sensing block 130 (refer to S1 in FIG. 5), positioning a gap guide tab 147 having a smaller thickness (e.g., 0.6 mm) than a thickness (e.g., 1.2 mm) of the second sensing lead line 144 in parallel with the second sensing lead line 144 on the housing wall 132 (refer to S2 in FIG. 5), attaching the pouch contact probe 145 on a housing bottom 133 between the second sensing lead line 144 and the individual cell pouch 115 to form physical and electrical connection (refer to S3 in FIG. 5); and removing the gap guide tab 147 after attaching the pouch contact probe 145 (refer to S4 in FIG. 5).

In the steps S3 and S4, since the pouch contact probe 145 is formed of the metal fabric foam having the flame retardancy and physical variability, the pouch contact probe 145 may provide the characteristics of variability in the width and length by being tightly fitted between the second sensing lead line 144 and the cell pouch 115.

During the installation process utilizing the gap guide tab 147, the pouch contact probe 145 may form a first overlap portion ov1 overlapping with a predetermined thickness (e.g., 0.6 mm) or more with the second sensing lead line 144 in contact with a first end portion, and form a predetermined gap with the housing wall 132 of the sensing block 130.

In addition, the pouch contact probe 145 may form a second overlap portion ov2 overlapping with a predetermined thickness (e.g., 1 mm) or more with an upper cut end of the cell pouch 115 in contact with a second end portion.

Therefore, contact performance between the battery cell pouch 115 and the second sensing lead line 144 positioned on the pouch contact probe 145 may be improved without employing a separate positioning jig.

In addition, in the step S4, during the process of attaching the pouch contact probe 145, the gap guide tab 147 may enable overlapping with a predetermined thickness (e.g., 0.6 mm) with the second sensing lead line 144, thereby improving physical and/or electrical contact performance and simultaneously, maintaining a preset gap (e.g., 0.6 mm) with the housing wall 132.

The pouch contact probe 145 may be attached to the housing bottom 133 by using a double-sided adhesive tape 146.

In addition, a contact position of the pouch contact probe 145 may be positioned on the upper cut end of the cell pouch 115 of the individual battery cell 111.

Here, the contact position of the pouch contact probe 145 may be positioned on the upper cut end or a lower cut end of the cell pouch 115 of the individual battery cell 111.

However, according to the present embodiment, since the position of the PCB connector unit 141 may be positioned on the upper end of the sensing block 130, the contact position of the pouch contact probe 145 may be positioned on the upper cut end of the cell pouch 115 such that a connection length of the second sensing lead line 144 is as short as possible, thereby efficiently designing electrical wiring and reducing the influence of signal noise.

In addition, in the case of a need in a battery module assemble line, a worker may perform a visual inspection from the top of the battery module 100 to check whether or not there is normal contact between the pouch contact probe 145 and the cell pouch 115.

Referring back to FIG. 4, when the battery module 100 is under operation, the controller 200 according to an exemplary embodiment may collect sensing signals detected at the respective battery cells 111 through the interface module 140 and monitor the insulation state of the individual cell pouch 115.

The controller 200 may include at least one processor and data for monitoring the battery module 100 having a cell-unit monitoring structure according to an exemplary embodiment. The controller 200 may be applied to a battery management system (BMS) of an electric vehicle applied with the battery module 100, or to a battery inspection system of a production line in a factory for manufacturing the battery module 100.

For example, when the controller 200 is applied to the BMS, by detecting at least one pouch insulation characteristic of an insulation voltage, insulation resistance, and impedance of the individual battery cell 111 based on sensing signals collected through the interface module 140 during driving of the electric vehicle, the insulation state (OK or NG) of individual battery cells 111 for each cell pouch 115 as well as the battery module 100 may be identified. Therefore, by detecting a defect (NG) of a specific cell unit configured in the battery module 100 forming the battery pack of the electric vehicle, diagnosing the cause, and immediately alerting the user/mechanic, advantages of securing safety and performing effective maintenance with minimal cost may be achieved.

In addition, when the controller 200 is applied to the battery inspection system, by detecting at least one pouch insulation characteristic of an insulation voltage, insulation resistance, and impedance of the individual battery cell 111 based on sensing signals collected through the interface module 140, the insulation state (OK or NG) of individual battery cells 111 as well as the battery module 100 may be identified. Therefore, the advantage of simultaneously detecting insulation characteristics of individual pouches through the interface module 140 configured in the sensing block 130 may be achieved, without employing a separate inspection device to respective cells of the battery module 100 for inspection of the pouch characteristics.

The controller 200 according to an exemplary embodiment may be implemented as at least one processor operated by a predetermined program. The predetermined program may be programmed to execute each step in a method of cell-unit monitoring of a battery module according to an exemplary embodiment.

Hereinafter, the method of cell-unit monitoring of a battery module is described in detail with reference to the drawings.

Figure 6:
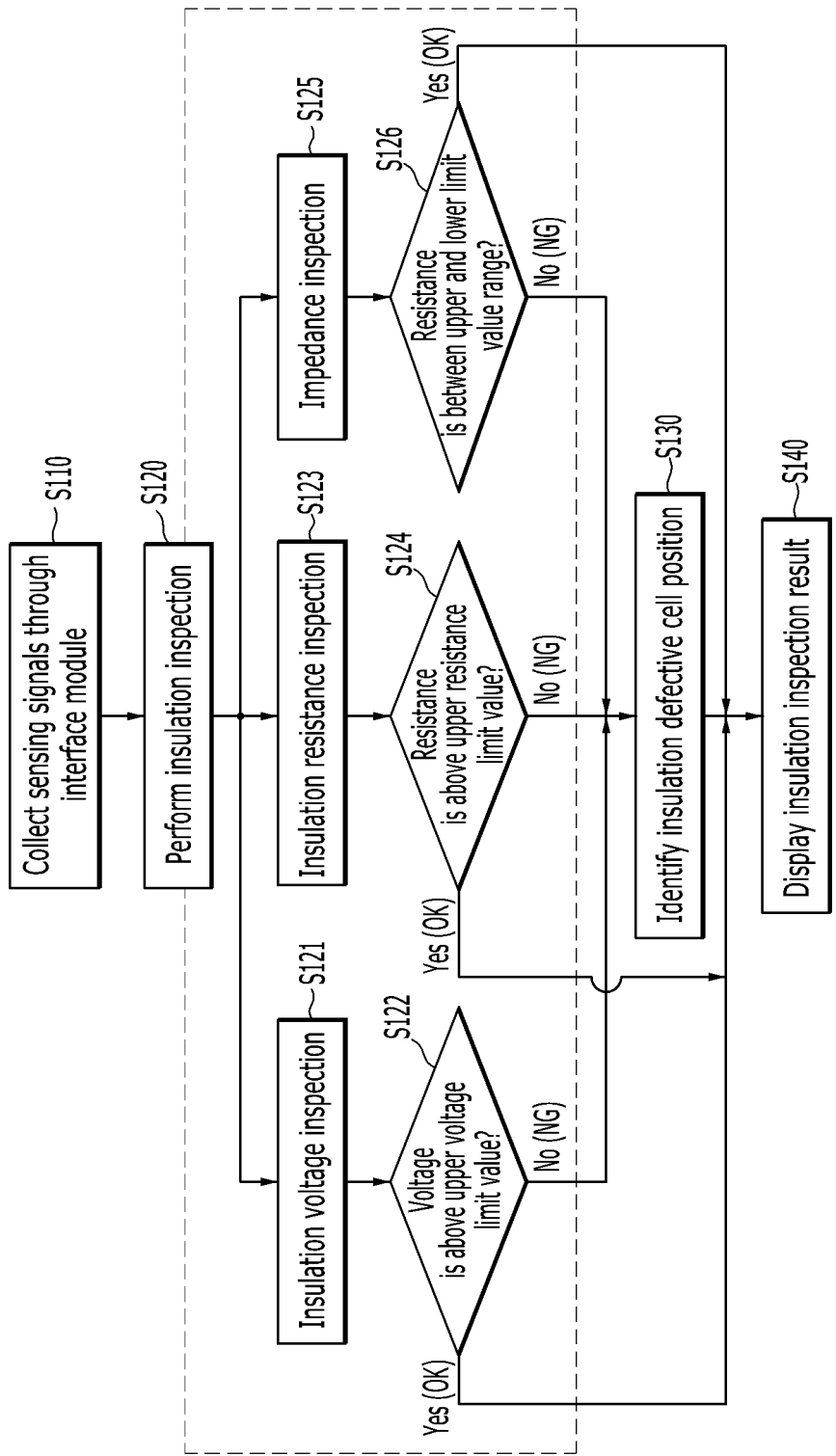
FIG. 6 is a flowchart schematically showing a method of cell-unit monitoring of a battery module according to an exemplary embodiment.

FIG. 6 is a flowchart schematically showing a method of cell-unit monitoring of a battery module according to an exemplary embodiment.

Figure 7:
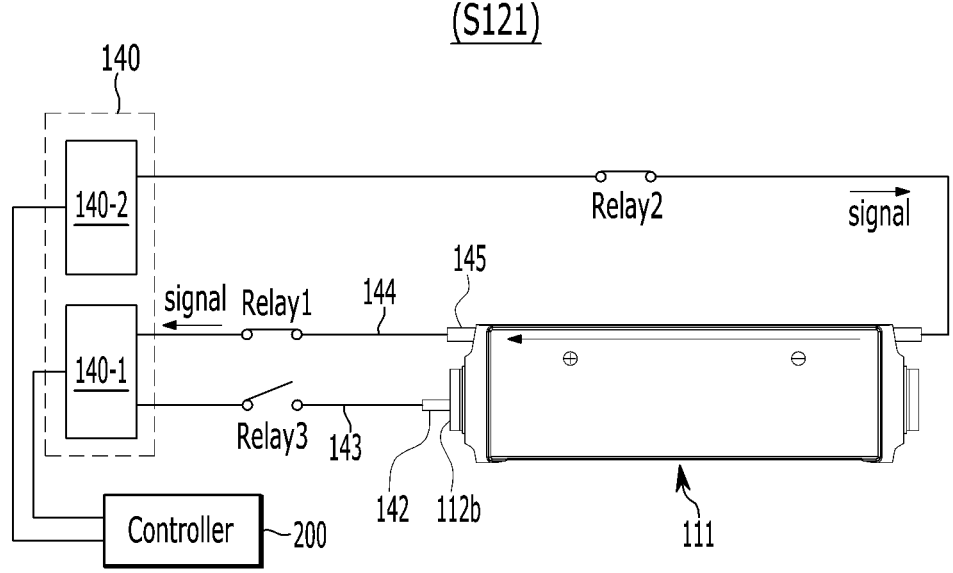
FIG. 7 illustrates principles of inspecting cell-unit insulation voltage and insulation resistance of a battery module according to an exemplary embodiment.
Figure 7:
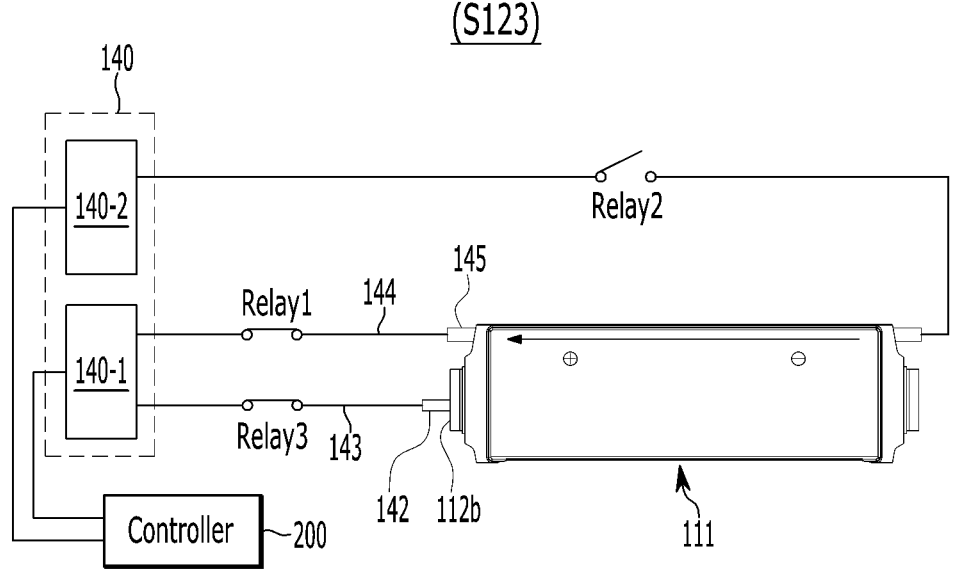

FIG. 7 illustrates principles of inspecting cell-unit insulation voltage and insulation resistance of a battery module according to an exemplary embodiment.

In FIG. 7, relays Relay 1, Relay 2, and Relay 3 are connected or disconnected depending on the inspection situation.

Referring to FIG. 6 and FIG. 7, at step S110, the controller 200 may start monitoring by collecting sensing signals through the interface module 140 electrically connected to the battery module 100.

At step S120, based on the collected sensing signal, the controller 200 may perform an insulation inspection that includes at least one of an insulation voltage inspection, an insulation resistance inspection, and an impedance inspection of the individual battery cell 111.

For example, at step S121, the controller 200 may perform an insulation voltage inspection that identifies a current conduction state by applying a low voltage source signal to both ends of the individual cell pouch 115 through the pouch contact probe 145 connected to the interface module 140.

At this time, at step S122, the controller 200 may compare a voltage in the current conduction state with a predetermined upper voltage limit value, and determine that the insulation state is good (i.e., normal) when the voltage is above the upper voltage limit value (S122—Yes).

On the other hand, when the voltage in the current conduction state is below the upper voltage limit value (S122-No), the controller 200 may determine that the insulation is defective (NG), identify the position (e.g., the order of stacking in the module) of the corresponding battery cell 111 at step S130, and display the insulation inspection result including the defective cell position through a display device at step S140.

In addition, at step S123, the controller 200 may perform the insulation resistance inspection that measures resistance between the negative electrode tab 112*b* and the cell pouch 115 of the individual battery cell 111 to identify whether insulation failure exists due to damage of the cell pouch 115.

At this time, at step S124, the controller 200 may compare the resistance with a predetermined upper resistance limit value, and determine that the insulation state is good (OK) when the resistance is above the upper resistance limit value (S124—Yes).

On the other hand, when the resistance is below the upper resistance limit value (S124-No), the controller 200 may determine that the insulation is defective (NG), identify the position of the corresponding battery cell 111 at the step S130, and display the insulation inspection result including the defective cell position at the step S140. Here, as a method of the insulation resistance inspection, the resistance may be measured for a preset period (e.g., 1 second) while applying DC 50V, and maximum resistance obtained during the measurement may be compared with the upper resistance limit value (e.g., 100 MΩ). At this time, when the maximum resistance becomes below the upper resistance limit value, it may be determined that the resistance between the cell pouch 115 and the negative electrode tab 112b is decreased, for example, due to anode connection due to the pouch damage.

In addition, at step S125, the controller 200 may perform the impedance inspection that extracts characteristic data of resistance and capacitance through current values obtained by applying an AC voltage between the negative electrode tab 112b and the cell pouch 115 of the battery cell 111.

Figure 8:
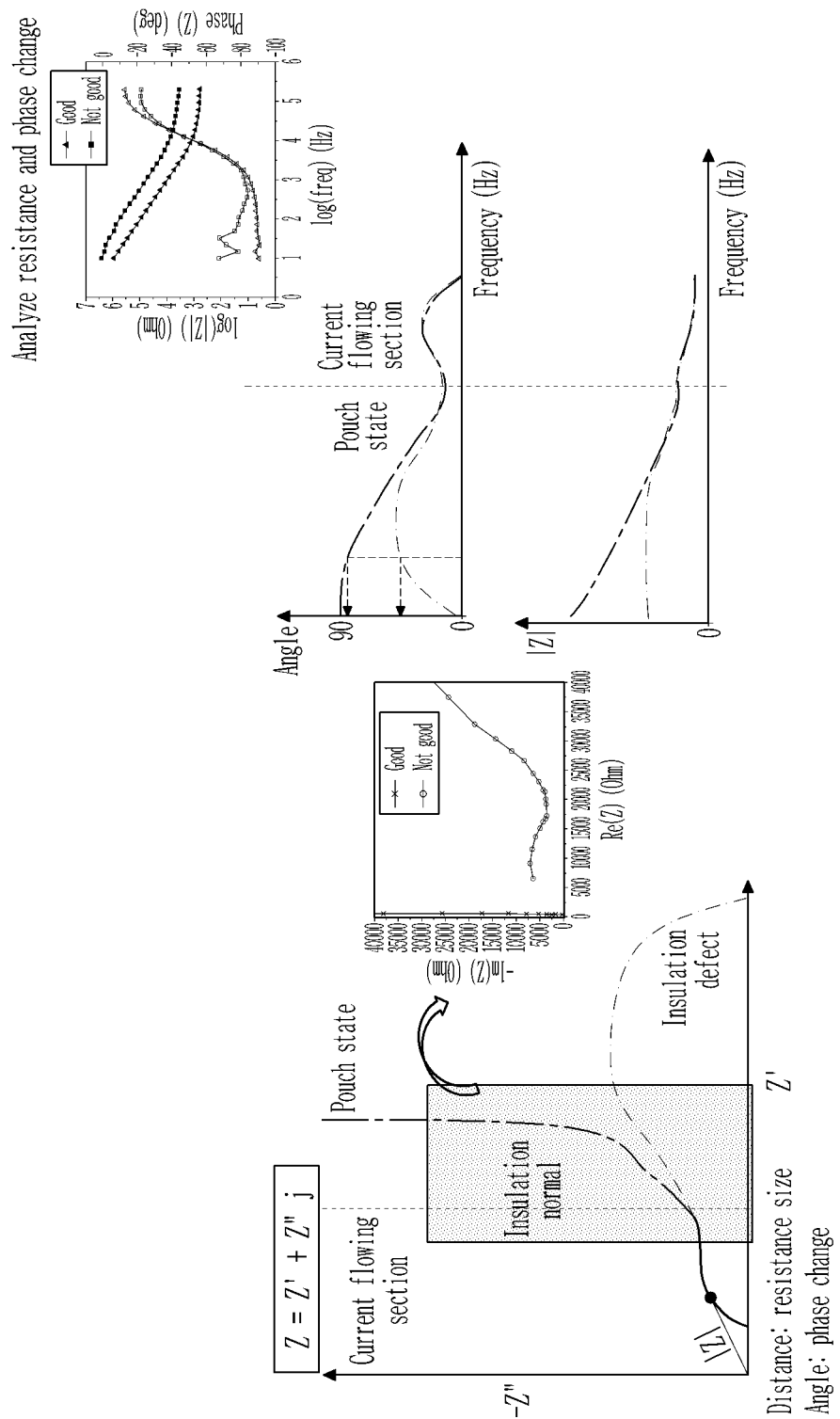
FIG. 8 illustrates an impedance inspection method according to an exemplary embodiment.

FIG. 8 illustrates the impedance inspection method according to an exemplary embodiment.

Referring to FIG. 8, the controller 200 may perform the impedance inspection by separating components of capacitance and resistance between the cell pouch 115 and the negative electrode tab 112b. In this case, specific resistance and a phase change at a specific frequency for each model on an electrochemical Nyquist plot and a Bode plot are analyzed.

At step S126, the controller 200 may compare the resistance with a predetermined upper and lower resistance limit value range (i.e., a range between an upper limit value and a lower limit value) for the impedance inspection, and the determine that the insulation state is good (OK) when the resistance exists within the upper and lower resistance value limit range (S126—Yes).

On the other hand, when the resistance does not exist within the upper and lower resistance limit value range (S126—No), the controller 200 may determine that the insulation is defective (NG), identify the position of the corresponding battery cell 111 at the step S130, and display the insulation inspection result including the defective cell position at the step S140.

In addition, the controller 200 may or may not display the insulation inspection result that identifies that the insulation is good. For example, the good insulation state may be displayed when applied to a battery production line of a factory and may not be displayed when applied to a vehicle.

In addition, the controller 200 may determine whether the current conduction state is normal by preferentially performing the insulation voltage inspection when performing the insulation inspection. In a current conduction defect situation such as a contact defect of the pouch contact probe 145, the resistance measured in the insulation resistance inspection may be above the predetermined upper resistance limit value (e.g., 100 MΩ) even if the insulation defect occurs in the cell pouch 115, and therefore, a situation of misjudging that the insulation is good may occur.

Therefore, in order to prevent the misjudgment in the current conduction defect situation, the insulation voltage inspection may be preferentially performed, or the insulation voltage inspection may be performed after performing the insulation resistance inspection, to verify that there is no misjudgment.

Figure 9A:
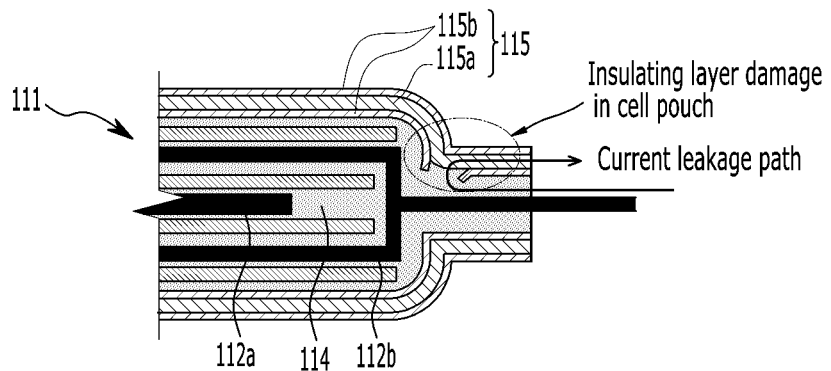
FIGS. 9A, 9B, and 9C show cases of diagnosing a battery insulation defect state according to an exemplary embodiment.
Figure 9B:
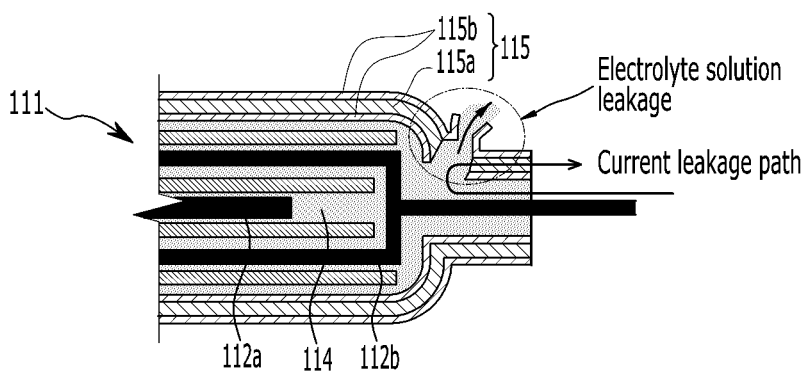
Figure 9C:
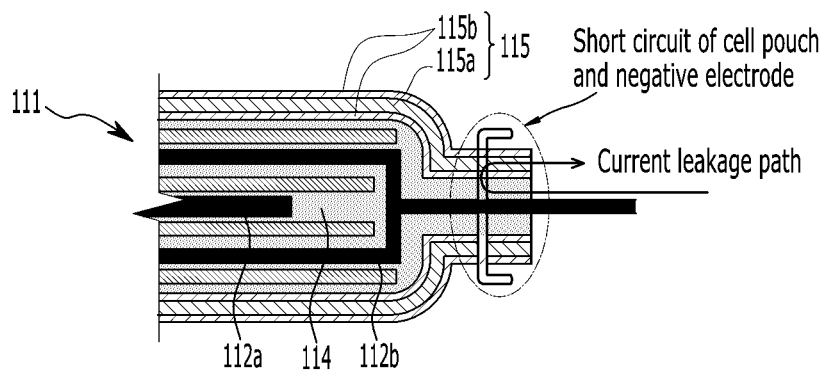

Meanwhile, FIGS. 9A, 9B, and 9C show cases of diagnosing a battery insulation defect state according to an exemplary embodiment.

Referring to FIGS. 9A, 9B, and 9C, the controller 200 according to an exemplary embodiment performs the insulation inspection including at least one of the insulation voltage inspection, the insulation resistance inspection, and the impedance inspection, and may detect an insulating layer damage situation in the cell pouch (FIG. 9A), an electrolyte solution leakage situation (FIG. 9B), and a short circuit situation between the electrode and the cell pouch (FIG. 9C).

For example, through the insulation inspection, the controller 200 may detect the damage of the insulating layer 115b within the cell pouch 115, and may detect the electrolyte solution leakage, e.g., due to at least one of tearing, puncturing, and unsealing of the cell pouch 115.

In addition, when the resistance measured through the insulation inspection is 0 (zero), the controller 200 may determine that the negative electrode tab 112b and the aluminum layer 115a of the cell pouch 115 are short-circuited by forced metal clamping or foreign substances.

As such, according to an exemplary embodiment, the interface module may be configured to connect the electrode tab and the cell pouch in the individual battery cell within the battery module, and thereby the insulation state of the individual battery cell may be monitored during the process of the manufacturing the battery or after installation into the electric vehicle.

In addition, since the insulation state of each battery cell in a battery pack applied to an electric vehicle may be precise checked, advantages of securing safety and performing effective maintenance with minimal cost may be achieved, by identifying defect in respective battery cells in real time through a BMS and displaying a diagnosis result including the defect cause and the defective cell position.

In addition, the advantage of simultaneously detecting insulation characteristics of individual pouches through the interface module may be achieved, without employing a separate inspection device to respective cells of the battery module for inspection of the pouch characteristics.

The exemplary embodiments of the present disclosure described above are not only implemented by the apparatus and the method, but may be implemented by a program for realizing functions corresponding to the configuration of the embodiments of the present disclosure or a recording medium on which the program is recorded.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

| | |
|---|---|
| 100: battery module | 110: cell stack |
| 111: battery cell | 112: electrode tab |
| 112a: positive electrode | 112b: negative electrode |
| 113: separator | 114: electrolyte solution |
| 115: cell pouch | 115a: aluminum layer |
| 115b: insulating layer | 120: case |
| 121: end plate | 122: top cover |
| 123: lower clamp | 130: sensing block |
| 131: cell barrier | 132: housing wall |
| 133: housing bottom | 140: interface module |
| 141: PCB connector unit | 142: busbar |
| 143: first sensing lead line | 144: second sensing lead line |
| 145: pouch contact probe | 146: double-sided adhesive tape |
| 147: gap guide tab | 200: controller |

What is claimed is:

1. A battery module having a cell-unit monitoring structure, comprising:
   a battery cell stack formed by stacking a plurality of battery cells sealed by an individual cell pouch;
   a case configured to cover the battery cell stack through an assembly structure of a plurality of plates; and a sensing block comprising an interface module configured to measure a sensing signal by electrically connecting the individual cell pouch and battery cell electrode tabs exposed through the front side and the rear side of the case, wherein the interface module comprises:
- a printed circuit board (PCB) connector unit configured to communicate with a controller of an external system;
- a plurality of busbars electrically connected to the electrode tabs exposed from the battery cell and configured to sense voltage information;
- a first sensing lead line configured to connect the plurality of busbars and the PCB connector unit; and
- a pouch contact probe configured to physically contact the individual cell pouch and a second sensing lead line configured to electrically connect the individual cell pouch and the PCB connector unit.

2. The battery module of claim 1, wherein:
the PCB connector unit comprises a plurality of terminals that are respectively connected to the first sensing lead line and the second sensing lead line; and
the sensing signal measured from an individual battery cell and a corresponding cell pouch is distinguished according to the plurality of terminals.

3. The battery module of claim 1, wherein, in the sensing block:
insulation cell barriers are formed protruding at regular intervals in a width direction at an upper end portion of a housing; and
the second sensing lead line and the pouch contact probe are disposed between adjacent insulation cell barriers.

4. The battery module of claim 1, wherein:
the second sensing lead line is disposed on a housing wall formed between insulation cell barriers of the sensing block; and
the pouch contact probe is disposed between and configured to physically connect the second sensing lead line and the individual cell pouch.

5. The battery module of claim 4, wherein the pouch contact probe is formed of a metal fabric foam having flame retardancy and physical variability to overlap with the second sensing lead line and the individual cell pouch, respectively.

6. The battery module of claim 1, wherein a contact position of the pouch contact probe is positioned on a cut end of a cell pouch of an individual battery cell.

7. A monitoring system comprising:
a battery module having a cell-unit monitoring structure according to claim 1; and
a controller configured to collect sensing signals detected at respective battery cells through an interface module of the battery module.

8. The monitoring system of claim 7, wherein the controller is applied to a battery management system of an electric vehicle or a battery inspection system of a battery production line.

9. The monitoring system of claim 7, wherein the controller is configured to monitor the insulation state of the individual cell pouch by performing a method comprising:
performing an insulation inspection based on the collected sensing signals, the insulation inspection comprising at least one of an insulation voltage inspection, an insulation resistance inspection, and an impedance inspection of an individual battery cell unit; and
displaying an insulation inspection result comprising a defective cell position when an insulation defect occurs.

10. The monitoring system of claim 9, wherein the insulation voltage inspection comprises:
identifying a current conduction state by applying a source signal to both ends of the individual cell pouch through a pouch contact probe connected to the interface module; and
determining that, by comparing a voltage in the current conduction state with a predetermined upper voltage limit value, the insulation is defective when the voltage is below the upper voltage limit value.

11. The monitoring system of claim 9, wherein the insulation resistance inspection comprises:
measuring resistance between a negative electrode tab and the cell pouch of the individual battery cell; and
determining that, by comparing the resistance with a predetermined upper resistance limit value, the insulation is defective when the resistance is below the upper resistance limit value.

12. The monitoring system of claim 9, wherein the impedance inspection comprises:
extracting characteristic data of resistance and capacitance through current values obtained by applying an AC voltage between a negative electrode tab and the cell pouch of the individual battery cell;
comparing the resistance with a predetermined upper and lower resistance limit value range defined for the impedance inspection; and
determining that the insulation is defective when the resistance does not exist within the upper and lower resistance limit value range.

13. The monitoring system of claim 12, wherein, in the impedance inspection:
components of capacitance and resistance between the cell pouch and the negative electrode tab are separated; and
specific resistance and a phase change at a specific frequency for each model on an electrochemical Nyquist plot and a Bode plot are analyzed.

14. A battery module comprising:
a case configured to cover a stack of a plurality of battery cells sealed by an individual cell pouch; and
a sensing block comprising an interface module configured to measure a sensing signal by electrically connecting the individual cell pouch and battery cell electrode tabs exposed through the front side and the rear side of the case, wherein the interface module comprises:
a PCB connector unit positioned on an upper portion of the sensing block;
a plurality of busbars electrically connected to the electrode tabs exposed from the battery cell and configured to sense voltage information;
a first sensing lead line configured to connect the plurality of busbars and the PCB connector unit;
a pouch contact probe configured to physically contact an upper cut end of the individual cell pouch; and
a second sensing lead line configured to electrically connect the pouch contact probe and the PCB connector unit.

15. The battery module of claim 14, wherein, in the sensing block:
insulation cell barriers are formed protruding at regular intervals in a width direction at an upper end portion of a housing; and the second sensing lead line and the pouch contact probe are disposed between adjacent insulation cell barriers.

16. The battery module of claim 14, wherein the PCB connector unit comprises a plurality of terminals that are respectively connected to the first sensing lead line and the second sensing lead line to distinguish positions and sensing signals of individual battery cells.

17. The battery module of claim 14, wherein the pouch contact probe is configured to form a first overlap portion overlapping with a predetermined thickness or more with the second sensing lead line in contact with a first end portion and to form a predetermined gap with a housing wall of the sensing block.

18. The battery module of claim 17, wherein the pouch contact probe is configured to form a second overlap portion overlapping with a predetermined thickness with the upper cut end of the individual cell pouch in contact with a second end portion.

* * * * *